Aug. 26, 1924.
H. J. SLOWEY
ROAD GUIDE
Filed Jan. 27, 1922   2 Sheets-Sheet 2
1,506,678
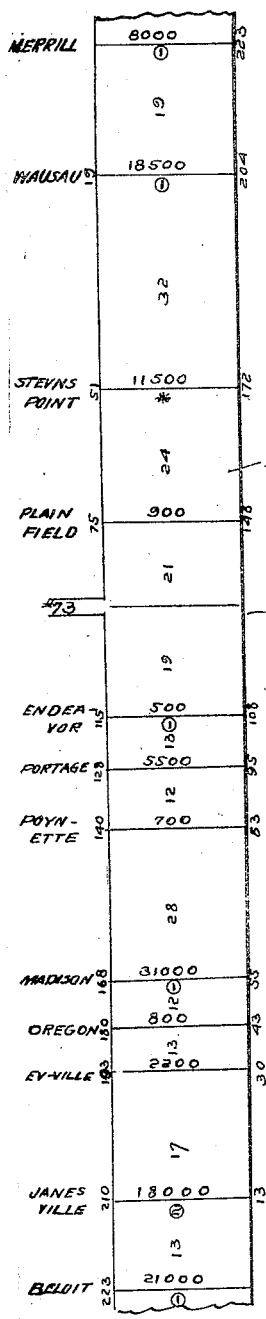
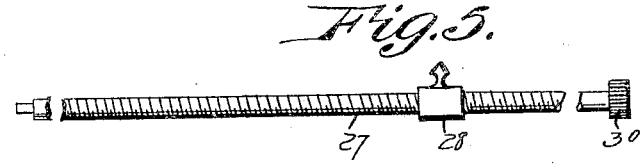
Fig.5.
Fig.4.
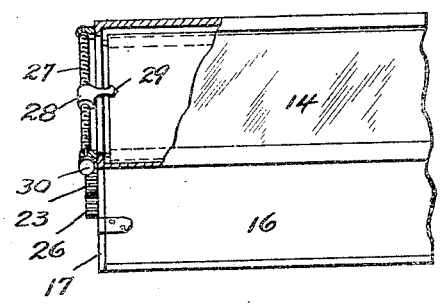
Fig.6.
Inventor
Herbert J. Slowey,
By
Attorney Patented Aug. 26, 1924.

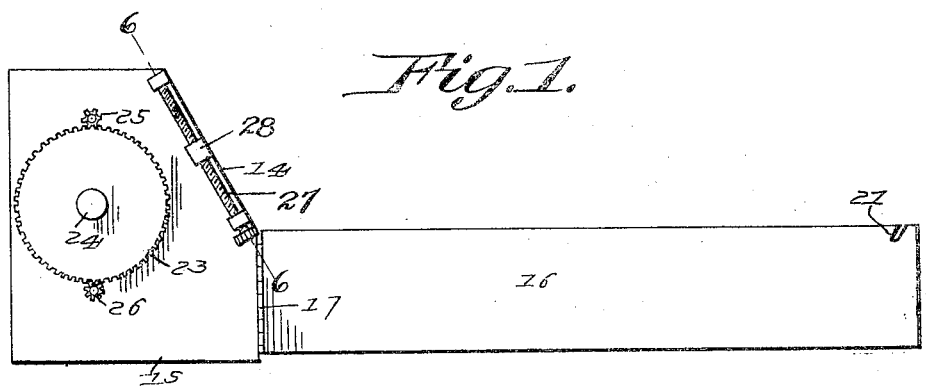
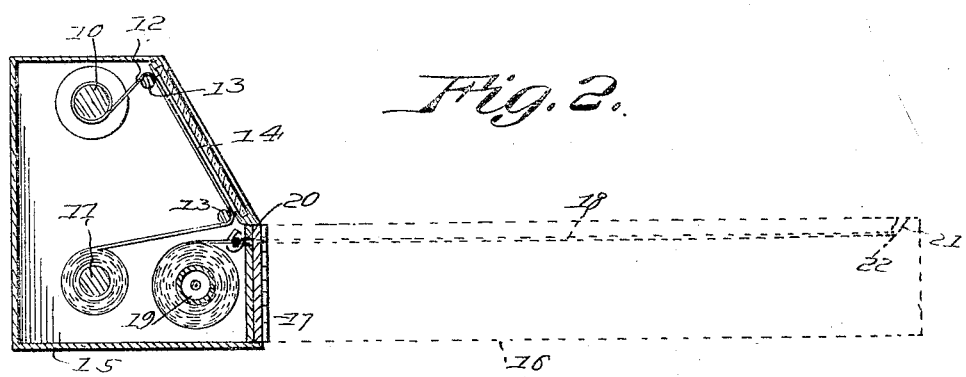
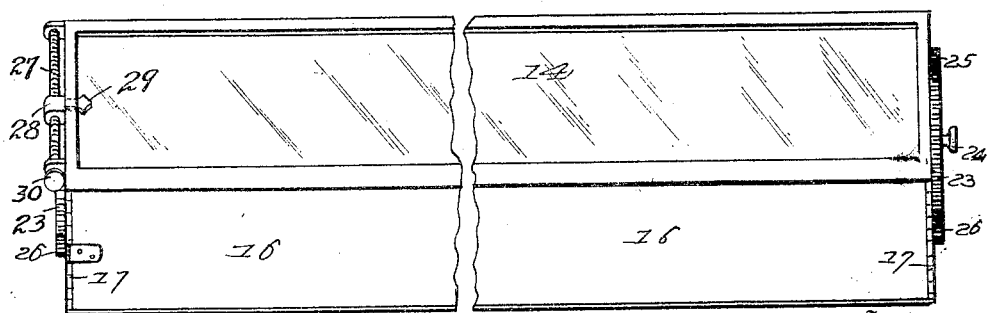

1,506,678

UNITED STATES PATENT OFFICE.

HERBERT J. SLOWEY, OF PORTAGE, WISCONSIN.

ROAD GUIDE.

Application filed January 27, 1922. Serial No. 532,146.

*To all whom it may concern:*

Be it known that I, HERBERT J. SLOWEY, a citizen of the United States of America, residing at Portage, in the county of Columbia and State of Wisconsin, have invented new and useful Improvements in Road Guides, of which the following is a specification.

The object of the invention is to provide a simple and efficient means for carrying and displaying road maps for the guidance of tourists by automobile or similar means of transportation whereby the direction and extent of progress and the land marks may be indicated continuously to the driver in an effort to follow a predetermined route; and in that connection to provide means whereby the approximate location of the vehicle at any given time may be determined by a comparison between the road map and a movable indicator timed to accord with the progress of the vehicle; and with these objects in view the invention consists in a construction and combination of parts of which a preferred embodiment is shown in the accompanying drawings, wherein:—

Figure 1 is a side view of an apparatus embodying the invention.

Figure 2 is a sectional view of the same.

Figure 3 is a front view.

Figure 4 is a plan view of a section of the route sheet or ribbon.

Figure 5 is a detail view of a travelling indicator adapted for use in connection with the route sheet or ribbon and adapted for actuation by means similar to speedometers now in common use.

Figure 6 is a section on the line 6—6 of Figure 1.

The device consists of drums 10 and 11 to which are attached the extremities of a route sheet or ribbon 12 such as that indicated in detail in Figure 4, which traverses guide or direction rollers 13 for exposure of a portion of its length, progressively changeable, through a transparent panel 14 in the front of a casing 15 in which the drums and ribbon are housed; in connection with map extending means consisting of arms 16 which are hingedly mounted as at 17 upon the front of the casing below the panel 14 for folding movement into positions parallel with the casing when not in use, as shown in Figure 3 and in full lines in Figure 2, and for extension into positions perpendicular with the casing as shown in Figure 1 and in dotted lines in Figure 2 for supporting in an extended position a map 18 which is normally reeled upon a spring drum 19 also housed within the casing and adapted for extension through a guide slot 20 in the front wall thereof. The upper edges of the arms 16 near their free ends are provided with seats consisting of notches 21 for engagement by a terminal marginal rod 22 on the map to hold it in the extended position during inspection and comparison with the portion of the route sheet or ribbon which is exposed through the panel 14.

The route sheet is adapted for feeding movement progressively and in a reverse direction as for example by means of an operating gear 23 having a knob 24 and engaged with pinions 25 and 26 which are attached to the extremities of the drums 10 and 11 respectively, so that as the vehicle proceeds the route sheet may be advanced in a corresponding direction to successively bring notation of land marks and other data into the view of the driver of the car for guidance in following the outlined route.

The route sheet which is preferably used in this connection contains not only the names of the towns through which the route lies with the distances between successive towns, directions by compass or otherwise and similar data, common to road maps, and also accumulative distances both in forward or reverse order between the ends or termini of the route disclosed, and if desired such other data as the respective population of the towns or hamlets en route, the principal hotels to be respectively found therein and the like.

Furthermore as an additional means of enabling the driver to determine his position or location with reference to the route, there may be employed one or more progressive indicators such as that shown in detail in Figure 5 and consisting of a feed screw 27 mounted in the casing parallel with the direction of movement of the route strip and carrying a traveller 28 having a pointer 29 for traversing the surface of the exposed portion of the route strip, said feed screw through a gear 30 or its equivalent being adapted to receive motion from a wheel of the vehicle in accordance with the practice usually employed with regard to speedometers and like instruments, no specific illustration of such connections, however, being deemed necessary and therefore are not being included in the drawings.

Having described the invention, what is claimed as new and useful is:—

In a route indicating apparatus for tourists, the combination with a casing including a progressive route indicating mechanism, of a spring roller mounted in the casing and carrying a map, a cross rod permanently fixed to the terminal marginal edge of the map and provided with extended ends, and map extending means consisting of a pair of arms hingedly mounted upon the casing and provided on their upper edges adjacent their terminal extremities with seats for the reception of the extended ends of the cross rod whereby, upon rotating the cross rod, the map may be wound manually upon the rod progressively as the route mechanism is progressed manually, said arms being foldable in collapsed positions adjacent the casing when the map is not in use.

In testimony whereof he affixes his signature.

HERBERT J. SLOWEY.